US011132639B2

(12) United States Patent
Boal

(10) Patent No.: US 11,132,639 B2
(45) Date of Patent: *Sep. 28, 2021

(54) SYSTEM FOR BIFURCATED TRANSACTION FOR PRODUCTS AT A BRICK-AND-MORTAR STORE

(71) Applicant: Quotient Technology Inc., Mountain View, CA (US)

(72) Inventor: Steven R. Boal, Los Altos, CA (US)

(73) Assignee: QUOTIENT TECHNOLOGY INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/859,126

(22) Filed: Apr. 27, 2020

(65) Prior Publication Data
US 2020/0258034 A1 Aug. 13, 2020

Related U.S. Application Data

(63) Continuation of application No. 16/172,093, filed on Oct. 26, 2018, now Pat. No. 10,636,010.

(60) Provisional application No. 62/577,632, filed on Oct. 26, 2017.

(51) Int. Cl.
G06Q 10/08 (2012.01)
G06F 12/0831 (2016.01)
G06Q 20/12 (2012.01)
G06F 9/38 (2018.01)
G06F 9/30 (2018.01)
G06F 12/0811 (2016.01)

(52) U.S. Cl.
CPC ......... G06Q 10/087 (2013.01); G06F 9/3004 (2013.01); G06F 9/30076 (2013.01); G06F 9/3834 (2013.01); G06F 12/0831 (2013.01); G06Q 20/12 (2013.01); G06F 12/0811 (2013.01)

(58) Field of Classification Search
CPC .... G06Q 10/087; G06Q 20/12; G06Q 20/208; G06Q 20/20; G06F 12/0831; G06F 9/3834; G06F 9/3004; G06F 9/30076; G06F 12/0811
USPC ...................................... 340/572.1
See application file for complete search history.

(56) References Cited

U.S. PATENT DOCUMENTS

| 6,249,773 | B1* | 6/2001 | Allard | G06Q 30/06 |
| | | | | 705/26.8 |
| 10,636,010 | B2* | 4/2020 | Boal | G06Q 20/20 |
| 2006/0178947 | A1* | 8/2006 | Zsigmond | B07C 5/34 |
| | | | | 705/26.1 |
| 2007/0024691 | A1* | 2/2007 | Shin | B41J 2/395 |
| | | | | 347/141 |

(Continued)

Primary Examiner — Daryl C Pope
(74) Attorney, Agent, or Firm — Baker Botts L.L.P.

(57) ABSTRACT

According to an embodiment, one or more computing devices process a bifurcated transaction for items available at a store. The bifurcated transaction is initiated when a consumer orders a set of first item(s) electronically, e.g., using an app, website etc. At the store, the consumer picks up the order of the set of first item(s) and then peruses and adds a set of second item(s) to a shopping cart. In one embodiment, a label (e.g., a single unique machine-readable label or barcode) identifies the set of first item(s). At checkout, the transaction may be completed by scanning respective machine-readable labels on the set of second item(s) and the label that identifies the set of first item(s).

18 Claims, 8 Drawing Sheets

(56) References Cited

U.S. PATENT DOCUMENTS

2010/0198701 A1* 8/2010 Bonner .............. G06Q 30/0601
                                                    705/26.1
2013/0275247 A1* 10/2013 Ramaratnam ........ G06Q 20/203
                                                    705/22

* cited by examiner

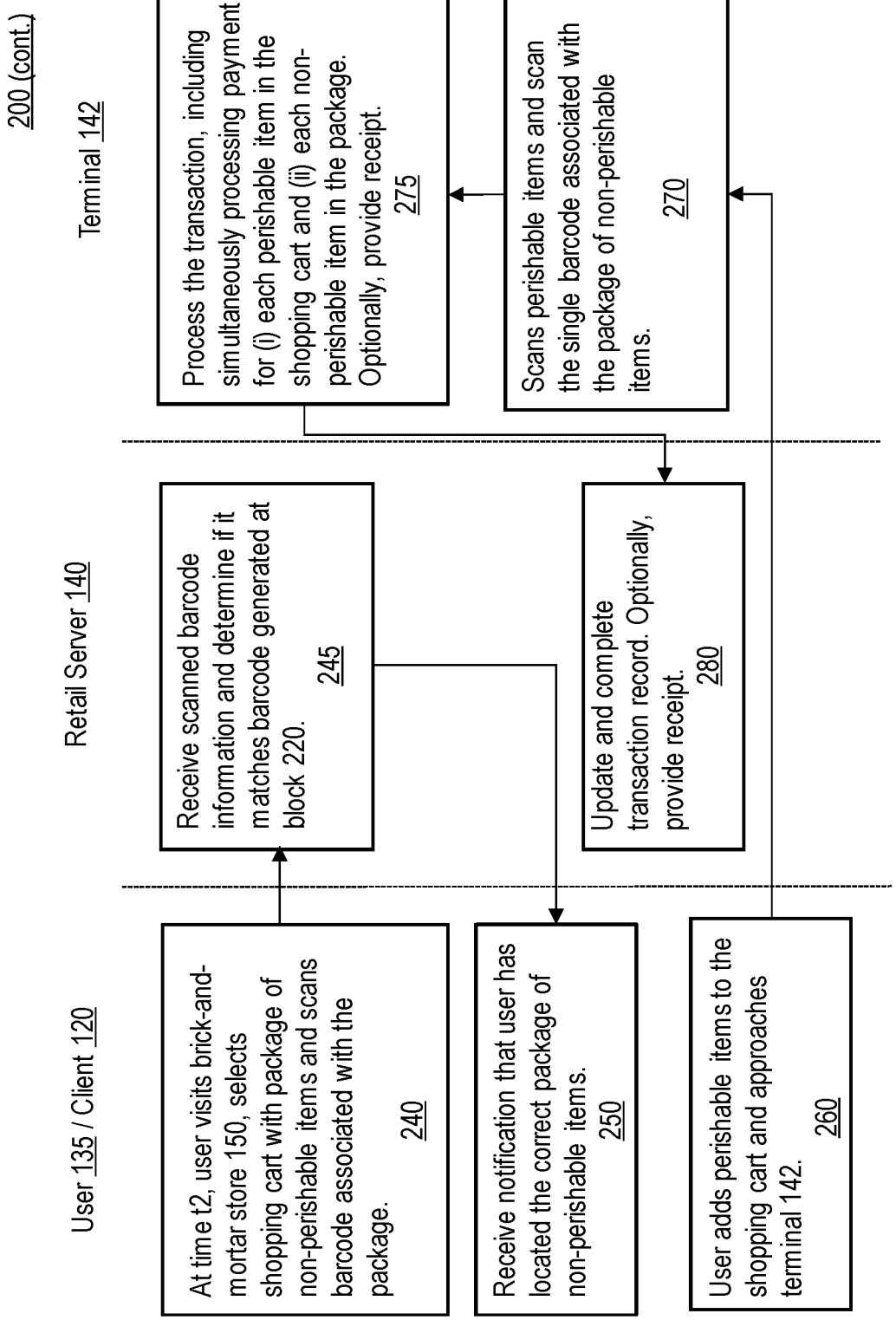

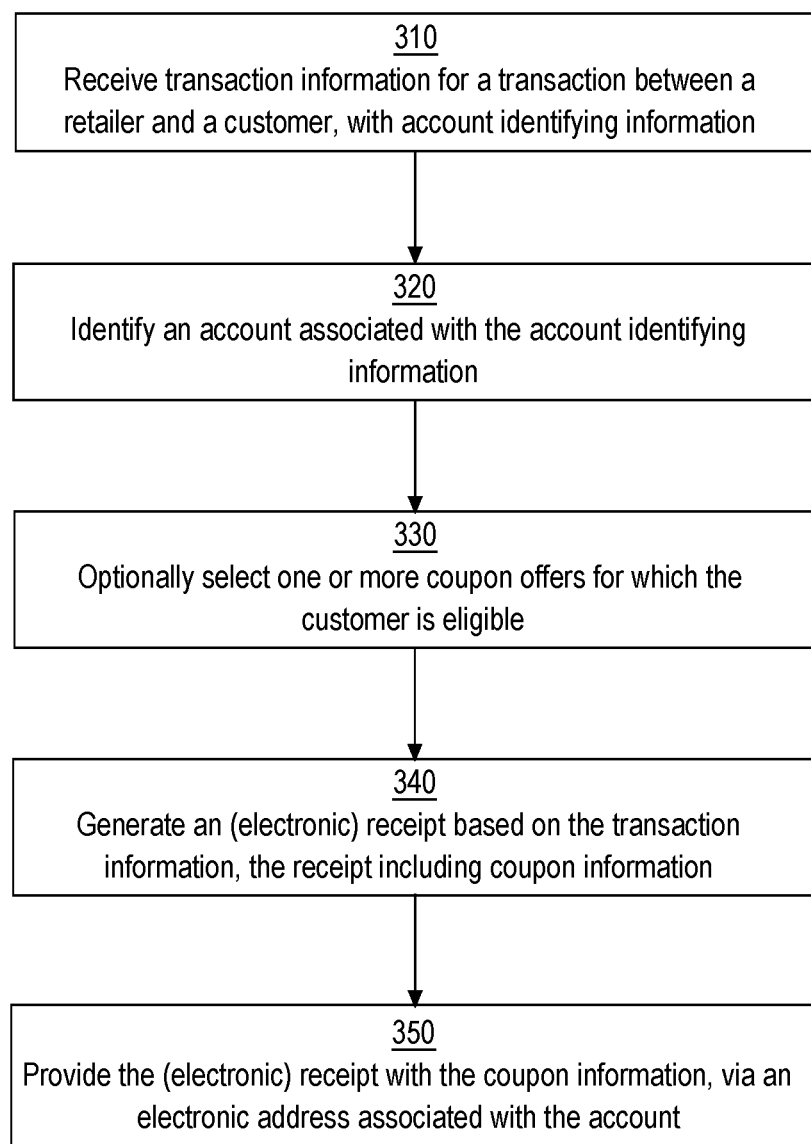

FIG. 4

From: Superstore Receipts (receipts@superstore.com)
To: Johnny Johnson (johnny@johnson.net)
Sent: August 15, 2011, 9:45 A.M.
Subject: Your Superstore Receipt (#000293861)

Johnny,

Thank your recent shopping trip to Superstore. Here is your electronic receipt.

| Transaction: | #000293861 | Terminal: | 0313019 |
|---|---|---|---|
| Date/Time: | 08-15-2017, 09:36:12 | Sales Rep: | Miller, L. |
| Superstore Location: | Mountain View, CA (#313) | | |

| Quantity | Item | Price | Total |
|---|---|---|---|
| 2 | Brand X Cereal | 2.99 | 5.98 |
| | *Coupon: Buy 1 Get 1 Free* | | -2.99 |
| 1 | Brand Y Dish Soap | 5.33 | 5.33 |
| | Special Offers: | | |
| | *Save $2.00 on Lunch Meat* | | |
| 1 | Funny Movie (DVD) | 10.00 | 10.00 |
| | *Sneak Peak: Funny Movie II* | | |
| 4 | Chocolate Candy | 0.49 | 1.96 |
| 1 | 1 ga. Brand Z Ice Cream - Rocky Road | 4.24 | 4.24 |
| | Special Offer: | | |
| | *Try New Super Medicine, 2 for 1* | | |
| | Tax (8.25%) | | 2.02 |
| | Total | | 26.54 |
| | Payment: Cash | | -6.54 |
| | Payment: Credit Card XXXX-XXXX-XXXX-0001 | | -20.00 |
| | Special Offer: | | |
| | *Pay with Mobile Wallet and save* | | |

Bonus Offer:
*$5 off next Purchase*

SYSTEM FOR BIFURCATED TRANSACTION FOR PRODUCTS AT A BRICK-AND-MORTAR STORE

BENEFIT CLAIM

This application claims the benefit as a continuation of U.S. application Ser. No. 16/172,093, filed Oct. 26, 2018, which claims the benefit of U.S. application No. 62/577,632, filed Oct. 26, 2017, the entire contents of each of which are hereby incorporated by reference for all purposes as if fully set forth herein.

TECHNICAL FIELD

Embodiments relate generally to the distribution of goods via a retail store and managing and fulfilling customer orders therefor.

BACKGROUND

Approaches described in this Background section may include approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Internet based grocery shopping systems may make it convenient for users to purchase perishable items, such as fruits, vegetables, flowers etc., but suffer from various disadvantages. A first disadvantage has to do with customer preferences, as when a customer visits a grocery store and makes grocery purchases, the customer is able to make his/her selection based on an evaluation of the perishable items. The customer may, e.g., evaluate weight, price, ripeness, bruising, size, smell and other physical attributes of the perishable items. In the case of Internet grocery shopping, the customer is unable to make such an evaluation, and may end up selecting perishables that are useless for their intended purpose (e.g., avocadoes that won't ripen for a few days when the consumer wants to use them tomorrow). Another disadvantage with Internet based grocery shopping is that the customer has to make the purchase by specifying either weight (e.g., 2 lbs. of potatoes) or size (e.g., 3 small potatoes). It can be hard to judge for the customer just how much he/she will end up with, who thus, may end up with surprises in their grocery box. Another reason is the cost, as consumers may not wish to pay for steep delivery fees. For at least these reasons, shopping for groceries in a brick-and-mortar retail store ("store") is desirable.

However, shopping in stores is undesirable for consumers for other reasons, mostly to do with time. Finding items can be time-consuming, especially as stores frequently change aisle locations. Check-out lanes tend to be long and frustrating for consumers. For busy shoppers, shopping for repetitive stock-up non-perishable items (e.g., toilet paper) can be a disliked chore and annoying problem.

There is thus a need to satisfy consumer demand for groceries and non-perishable items in-store through new technologies and delivery systems that save time.

SUMMARY OF THE DISCLOSURE

The appended claims may serve to summarize the disclosure.

BRIEF DESCRIPTION OF THE DRAWINGS

In the drawings:

FIG. 2A and FIG. 2B illustrate a method flow for conducting a bifurcated transaction at a brick-and-mortar store, in accordance with an embodiment;

FIG. 3 illustrates a method flow for conducting a transaction in which a receipt may be provided, in accordance with an embodiment;

FIG. 4 illustrates an email comprising a receipt provided to a consumer, in accordance with an embodiment;

DESCRIPTION OF EXAMPLE EMBODIMENTS

In the following description, for the purposes of explanation, numerous details are set forth in order to provide a thorough understanding of various embodiments of the present disclosure. It will be apparent, however, that various embodiments of the present disclosure may be practiced without these specific details. In other instances, well-known structures and devices are shown in block diagram form in order to avoid unnecessarily obscuring the present disclosure.

1.0. General/Structural Overview

The following describes systems and methods for addressing needs such as described above, among other needs, by bifurcating shopping for perishable and non-perishable items in accordance with various embodiments.

Figure 1:
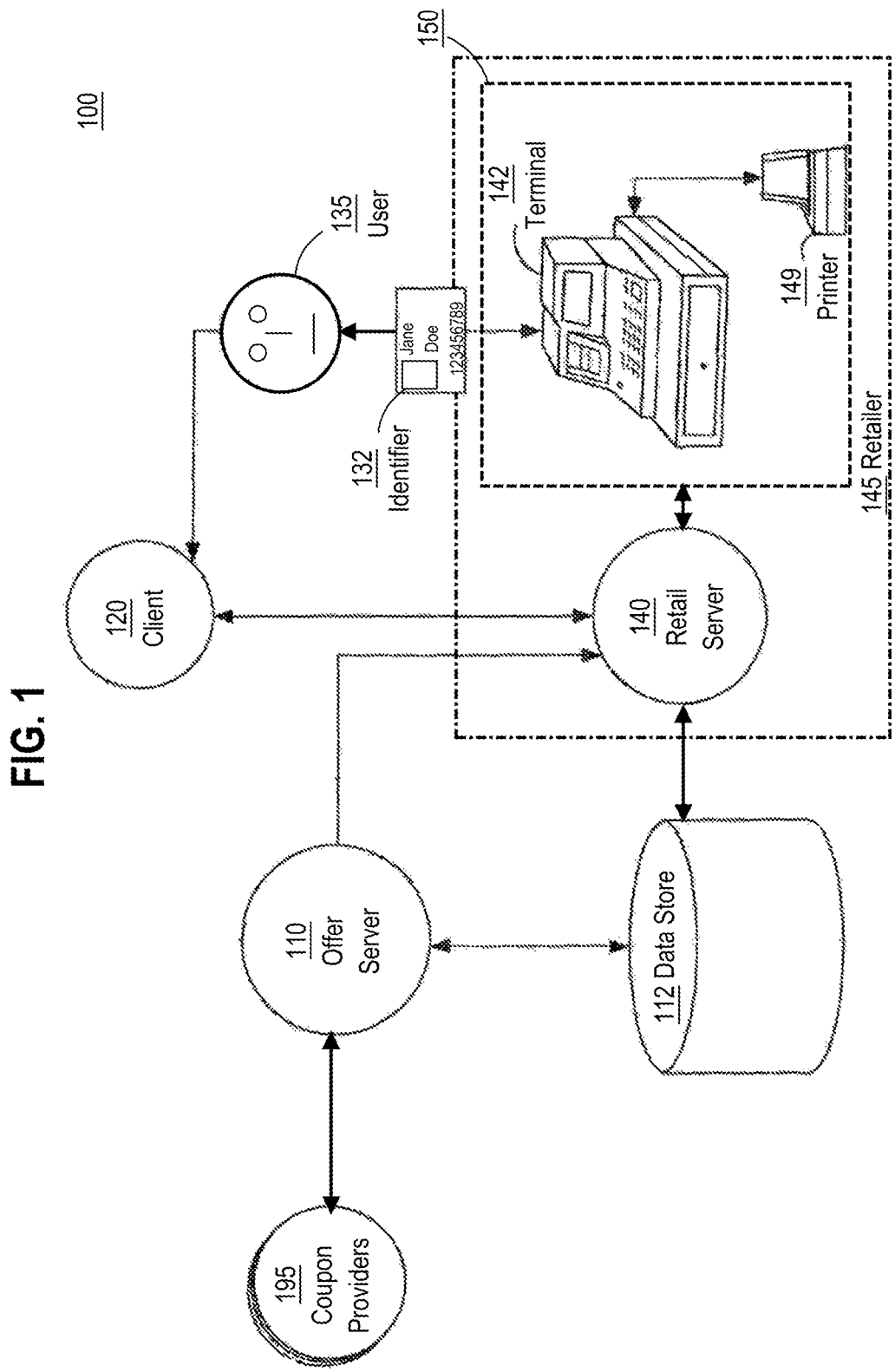
FIG. 1 illustrates an example system in which the techniques described herein may be practiced, in accordance with an embodiment.

FIG. 1 is a block diagram illustrating an example system 100 in which the techniques described herein may be practiced, according to an embodiment. System 100 comprises an offer server 110 operated by an offer distributor, a client 120 operated by a consumer 135, and a retail server 140 and terminal 142 operated by a retailer 145.

1.1. Retailer

Retailer 145 is any entity that conducts transactions in which consumers, such as consumer 135, purchase perishable and non-perishable items. Retailer 145 may be a single store, or a corporation that operates a group of stores. Consumer 135 may engage in transactions with retailer 145 (i) electronically via, e.g., a website or mobile app operated by or on behalf of retailer 145, and (ii) at a brick-and-mortar store 150 operated by retailer 145.

A transaction as used herein refers to the act of a retailer such as retailer 145 obtaining payment for the provision of, or the formation of a contract to provide, certain product(s). Obtaining payment may include receiving a physical or electronic transfer of payment, debiting an account, obtaining a hold on funds, securing funds in escrow, obtaining points or other non-monetary value from an account or escrow or other transfer, or obtaining any form of value from an electronic wallet. Products and purchases are collectively referred to herein as "items."

A transaction is initiated by a consumer electronically selecting non-perishable products to purchase, such as via a website or mobile app operated by or on behalf of retailer 145. The transaction is completed in the brick-and-mortar store 150 operated by retailer 145 where the consumer receives possession of the non-perishable products, and shops for perishable products. The consumer may utilize the brick-and-mortar store checkout process for perishable products by, for example, bringing selected products to terminal 142.

In one embodiment, the layout of the brick-and-mortar store is optimized to enable delivery of the non-perishable products to the consumer, and to enable consumer browsing and purchase of perishable products. For example, non-perishable products may be stored in a warehouse section of the brick-and-mortar store that not accessible to consumers and from which consumer orders are fulfilled using machines, robots or human operators, while the perishable products are displayed to consumers for their selection. The consumer-accessible section also contains the checkout systems, such as terminal 142.

1.2. Terminal

Terminal 142 is a data processing system operated by retailer 145 for conducting in-store (i.e. "point of sale") transactions. Terminal 142 may be, for example, a register operated by a sales clerk or a "self-checkout" stand operated by consumer 135. Terminal 142 comprises input mechanisms by which a clerk and/or the consumer may input information for conducting a transaction, including item identifiers and item quantities. The input mechanisms may include, without limitation, keyboards, pointing devices, touch screens, bar-code readers, cameras, scales, and radio frequency identification ("RFID") readers. Terminal 142 is coupled to a database of item identifiers (not shown), in which each item identifier is mapped to one or more prices. Terminal 142 may further comprise or be coupled to one or more payment mechanisms, such as a cash register, check verification system, or credit card reader.

Terminal 142 is coupled to a printing component 149 by which terminal 142 may print receipts of transaction data for transactions, once completed. In an embodiment, a printed receipt may include one or more coupons printed therein. Terminal 142 also or instead includes execution logic for causing electronic transaction receipts to be provided to consumer 135 via an electronic address, such as an email address, text messaging address, social messaging address, or URL. For example, terminal 142 may utilize a consumer identifier 132 of consumer 135 to locate account information that includes the electronic address. Such an account may be stored at, for example, retail server 140 or data store 112. Or, consumer 135 may provide the electronic address directly to terminal 142. Terminal 142 may then send the receipt to the electronic address, or provide the transaction details to retail server 140, that is configured to send the receipt or otherwise make the receipt available to user 135 at the electronic address. Terminal 142 may cause the digital transaction receipt to include offer information, such as general links to an offer distribution website or more specific links from which consumer 135 may obtain coupons for specific offer(s) displayed in association with the electronic receipt.

As used herein, "causing" performance of an action may be interpreted as sending, transmitting, or saving data that, when processed by an entity or any combination of entities at least partially triggers functionality at the processing entity or combination of entities that either performs the act or causes performance of the act.

Regardless of the type of receipt generated for transactions at terminal 142, as discussed further with reference to FIG. 3 and FIG. 4, the receipt is a receipt for the entire bifurcated transaction, including: (i) the consumer electronically ordering non-perishable products prior to a visit to brick-and-mortar store 150, and (ii) the consumer purchasing perishable products during the visit to brick-and-mortar store 150.

Further, the one or more coupons or offers associated with the receipt may be selected using a variety of techniques, including random selection, selection based on items in the transaction, selection based on the time or date of the transaction, and/or selection based on store location at which the transaction occurs. In an embodiment, terminal 142 requests that another server, such as a retail server 140 or offer server 110, identify the one or more offers based upon transaction information furnished by terminal 142.

In an embodiment, retailer 145 allows consumer 135 to redeem an offer by presenting a printed or digital coupon at terminal 142 while engaging in an applicable transaction. In an embodiment, retailer 145 allows consumer 135 to redeem an offer by presenting an identifier while engaging in a transaction. Terminal 142 uses the identifier to locate applicable coupon(s) that have been saved to the consumer's account. In an embodiment, terminal 142 communicates with offer server 110 and/or retail serve 140 to locate applicable coupon(s) that have been saved to the consumer's account. In an embodiment, terminal 142 instead relies upon offer server 110 to push coupon availability data for various account identifiers to retail server 140. For example, offer server 110 may periodically provide retail server 140 with a table of account identifiers and newly associated or disassociated digital coupon identifiers. Retail server 140 may then update a local database based on the coupon availability data.

Terminal 142 periodically, or in response to a transaction, may periodically send transaction data to offer server 110. The data may include one or more of sales price(s), transaction date(s) and time(s), and identifiers of product(s) or service(s) included in each transaction. The periodic requests may occur hourly, daily, or upon a certain number of transactions, for example.

1.3. Retail Server

In an embodiment, a brick-and-mortar store 150 and/or terminal 142 is coupled to retail server 140 via a network. In an embodiment, a server may refer to one or more components executing on one or more computers or devices that interact with counterpart client applications executing on other computers or devices. Thus, retail server 140 may refer to one or more server components executed at one or more computing devices under the control of retailer 145. Retail server 140 may coordinate transactions amongst a plurality of terminals 142 at one or more brick-and-mortar store(s) 150. In an embodiment, some or all of the communications to and from terminal 142 pass through retail server 140. In various embodiments, any number of functions described herein as being performed by a terminal such as terminal 142 may in fact be performed, at least in part, by retail server 140. Accordingly, terminal 142 may be a "thin client," and all functions other than input and output are shifted to retail server 140. In other embodiments, any number of functions described herein as being performed by a retail server such as retail server 140 may in fact be performed, at least in part, by terminal 142.

In an embodiment, retailer 145 hosts a website via retail server 140, at which consumer 135 may initiate transactions, such as place order of pick-up of non-perishable products, create and store shopping lists for perishable items, access electronic receipts and associated offer information via one or more web addresses. The website may be provided as a "digital locker" of receipts for transactions in which any of the consumer's identifiers have been provided. For example, a consumer 135 may login to a website hosted by retail server 140. Once logged in, consumer 135 may access a list of recent receipts by visiting a specific web address. The list of receipts may further contain links to web addresses hosted by the retail server 140 or an offer server 110 at which the consumer may obtain coupons for one or more offers. In an embodiment, such a website may also or instead be hosted by another entity such as offer server 110. The website may be accessed in response to a notification of the availability of a digital receipt, such as an email, text message, or operating system alert. The website may also or instead be accessed proactively by the consumer without having received a notification.

Retail server 140 receives transaction data, as may be generated by payment terminals 142, or by websites or web-based applications at online stores (not shown).

Retail server 140 further comprises a data processing system or logic module, which may provide various receipt-related functionality. Retail server 140 has one or more network interfaces over which it may transmit or otherwise make available to clients 120 receipts based at least on a consumer's 135 transaction history at brick-and-mortar store 150. Receipts may be provided using any of the techniques described herein.

In an embodiment, retail server 140 comprises executable logic similar to that of the offer server for generating coupons. For example, offer distributor may provide one or more libraries of offer distribution code for retailer 145 to utilize in retail server 140. As a condition of executing such logic, retail server 140 is configured to communicate periodically via an application program interface with offer server 110, via which offer server 110 provides retail server 140 with the coupon data necessary for retail server 140 to generate coupons. For example, offer server 110 may provide retail server 140 with terms of offers for which consumers of retail server 140 are currently eligible, instructions for generating a unique coupon identifier for each offer, and/or applicable distribution limits and parameters. Retail server 140 is further configured to report distributions to offer server 110 on a periodic basis.

In an embodiment, retail server 140 and terminal 142 are special-purpose computers configured with logic that can perform the operations described herein during operation. In an embodiment, client 120 is a general-purpose computer that comprises one or more processors, and memory, mass storage device, or other non-transitory computer-readable storage media storing instructions which, when loaded and executed, cause the one or more processors to perform the operations that are further described herein.

1.4. Offer Provider/Distributor

In an embodiment, an offer distributor is any entity capable of distributing offers on behalf of an offer provider, such as a manufacturer, retailer, or advertiser, and that operates offer server 110 for making offers available to consumers such as consumer 135. For the purposes of this disclosure, distributing an offer may refer to either or both of generating a coupon and saving an offer to a consumer account in association with one or more account identifiers. In this context, generating a coupon may include printing a coupon or creating and storing digital data representing a digital coupon.

Offer server 110 may be one or more server applications, executing at one or more computing devices operated by offer distributor. In an embodiment, offer server 110 is a special-purpose computer configured with logic that can perform the operations described herein during operation. In an embodiment, offer server 110 is a general-purpose computer that comprises one or more processors, and memory, mass storage device, or other non-transitory computer-readable storage media storing instructions which, when loaded and executed, cause the one or more processors to perform the operations that are further described herein.

Offer server 110 makes offers available to consumers, such as consumer 135, on behalf of one or more offer providers. In an embodiment, offer server 110 distributes printable coupons for various offers directly to consumer 135 via client 120, which is in turn may be coupled to a printer at which the printable coupons may be printed. Offer server 110 also makes digital coupons for various offers available to the consumer 135 by means of saving information identifying digital coupons requested by consumer 135 to one or more accounts associated with consumer 135. The consumer 135 may then provide a retailer 145 with an identifier for the account, such as a store loyalty account number or consumer name, so that retailer 145 may retrieve any applicable digital coupons during a transaction. Offer server 110 also makes digital coupons available to the consumer 135 indirectly, via retailer 145. For example, in response to a retail server 140, operated by retailer 145, requesting a digital coupon on behalf of consumer 135, offer server 110 may generate a digital coupon and provide retail server 140 with information about the generated coupon. In other embodiments, offer server 110 need not necessarily be capable of distributing offers via any particular technique described herein.

Offer server 110 receives and responds to offer-related requests from client 120 and retail server 145 over one or more networks, such as the Internet. Offer server 110 retrieves offer data from data store 112 to respond to various requests from client 120 and retail server 145. For example, client 120 may request offer server 110 to provide a listing of available offers, search for an offer based on keywords, save a specified digital coupon to a consumer account for consumer 135, or print a specified coupon. In response, offer server 110 may retrieve any relevant offer data from data store 112, process the offer data as appropriate, and, based on that processing, formulate a response to the client. In an embodiment, offer server 110 hosts one or more web sites for such interactions with client 120. The offer server 110 sends web pages to a web browser executing at client 120 with instructions for causing the web browser to display various graphical interfaces related to viewing, selecting, printing, and/or saving coupons. In an embodiment, offer server 120 features an application programming interface ("API") by which a dedicated application at client 120, having its own graphical interfaces, may communicate with offer server 120.

As another example, offer server 110 may provide retail server 140 with information about offer terms, digital coupon availability, and consumer accounts, via a suitable API. Retail server 140 may, in turn, provide offer server 110 with data indicating consumer coupon redemptions and/or transaction data.

Offer server 110 may be configured to control coupon distribution in a number of ways. For example, offer server 110 may be configured to deny a client permission to print the coupon, in accordance with device-based, client-based, or aggregate distribution limits. As another example, offer server 110 may be configured to deny a request to generate a coupon for a consumer if an equivalent coupon has already been generated from client 120. Offer server 110 may further be configured to deny a client permission to print a coupon based on geographic information associated with the client.

1.5. Data Store

Data store 112 may comprise one or more databases and/or file repositories. In one embodiment, data store 112 stores consumer account data. The consumer account data may include data for one or more different consumer accounts, each of which is mapped to a unique consumer. Some or all of the consumer accounts may have been established with a retailer 145, e.g., during an online or in-store registration process.

A consumer account record may include: (i) one or more account identifiers 132 for each consumer account that uniquely identifies the account, (ii) consumer identifying information, such as name, address, etc., (iii) one or more electronic addresses tied to each account, (iv) payment information, such as credit card, gift card, etc. (v) transaction history, such as previous transactions and purchase/return history, (vi) device data for a plurality of devices associated with the consumer, such as, for client 120, (vii) biometric data that uniquely identifies consumer 135, such as a fingerprint or a retinal scan, and so on. Device data may include information such as hardware identifiers, client identifiers, geographic information, and permissions data.

Optionally, a consumer account record may further include offer data identifying one or more digital coupons that are available to a consumer. Some or all of the one or more digital coupons may also be associated with other account identifiers associated with the consumer account. In an embodiment, these digital coupons are unique instances of corresponding offers, wherein each unique instance has a unique coupon identifier. For example, just as each coupon that may be printed by offer server 110 may have a unique coupon number, a unique coupon number may also be generated each time a consumer saves a digital coupon to the consumer's account. However, in other embodiments, the digital coupons do not require unique coupon identifiers.

The offer data may take a variety of forms, including database records and/or one or more files. Among other aspects, offer data may comprise, for each offer, data such as the name of the offer provider making the offer, distribution parameters, terms of the offer, print layout information and graphics, one or more internal or provider identification numbers, bar code generation information, one or more relevant uniform resource locators (URLs), one or more offer names or titles, one or more related search terms, clearinghouse information, and one or more related categories. Distribution parameters may include aggregate distribution limit values, per device distribution limit values, per region distribution limit values, and/or per client distribution limit values.

Data store 112 may also store inventory data, such as, product identifier, UPC, department, category, subcategory, segment, and line, quantities available, etc. Additional tables may exist for information such as item descriptions, attributes, ratings, historical prices, product images, and/or inventory.

In an embodiment, data store 112 stores transaction data, e.g., as a table of transaction logs. A transaction log is a unique record of the information captured at a store during a transaction. Besides recording items sold, promotions, and method of tender, transaction logs may include returns of goods, 'no sale' actions such as cash in/out, and associate clocking in/out. Generically known as Tlog, the actual content will vary between retailers. Common formats include IBM's GSA Tlog and Nation Retail Federations ARTS standard POSLog (XML).

For example, in an embodiment, a transaction log may include some or all of the following fields: transaction identifier, transaction duration, transaction date/time(s), master customer identifier, store identifier, retailer customer identifier, tender type(s), tender amount(s), register identifier, cashier name, transaction type, line item count, lane number, total purchase amount, percent savings, total amount saved, tax amount(s), currency code, currency conversion rate, store detail(s), discount amount, return by date, thank you message, loyalty points earned, current loyalty points, email address or mobile phone number for digital receipt, receipt delivery preference, payment identifier(s) such as credit card numbers and other PANs, and transaction line items. The transaction line items may, in turn, be stored in a separate table comprising fields such as transaction identifier, UPC, SKU, EAN/IAN, line item type, quantity, weight, unit price, item discount, associated offer identifier, item description, and so forth. In an embodiment, tender information for each type of payment tendered in a transaction may also be stored in a separate table, including fields such as tender number, tender identifier, tender type, tender amount, customer name, payment card token, method of entry (swiped, keyed, etc.), authorization code, tender amount, currency identifier, balance amount, cashback, voucher number, coupon number, and so forth.

1.6. Client

Client 120 may be any of a variety of devices, including a personal computer, printer, phone, or portable computing device. In an embodiment, client 120 is a wireless, portable, and/or battery powered computing device that the consumer commonly keeps with him or her while traveling, such as a phone, tablet, personal digital assistant, watch, and so forth. In an embodiment, client 120 comprises one or more application components that provide consumer 135 with an interface to offer server 110. Client 120 may be, for example, a standalone software application, a web browser, or a plug-in to a web browser. Client 120 need not necessarily be executed by a device that is owned or even exclusively operated by consumer 135. For example, client 120 may be executed by an in-store kiosk provided to consumers by retailer 145.

In an embodiment, client 120 is a special-purpose computer configured with logic that can perform the operations described herein during operation. In an embodiment, client 120 is a general-purpose computer that comprises one or more processors, and memory, mass storage device, or other non-transitory computer-readable storage media storing instructions which, when loaded and executed, cause the one or more processors to perform the operations that are further described herein.

Client 120 communicates with retail server 140 over a network such as the Internet to initiate a transaction, such as to place an order for non-perishable products. Client 120 is configured to execute instructions for a graphical interface by which the consumer communicates with retail server 140. The graphical interface may be provided by, for instance, a mobile application or a web application.

In an embodiment, client 120 is further configured to execute instructions for a graphical mobile payment interface by which the consumer communicates with a payment server during transactions with terminal 142. The mobile payment interface and coupon client interface may be integrated or separate. The interfaces may be activated by consumer input such as launching an application or selecting a link in an email, in response to unsolicited communications from offer server 110, the payment server, and/or in response to signals received from terminal 142. Client 120 may include communication interfaces by which client 120 is capable of communicating with terminal 142 during the transaction to effect payment, receive receipt data, and receive offer information about available offers upon completion of the transaction. Any suitable communication interface or combination of communication interfaces may be used, including Wi-Fi, cellular data, Bluetooth, Near-Field Communication, and so forth.

In an embodiment, client 120 is further configured to execute instructions for a receipt viewing and management interface by which the consumer views receipts for transactions between the consumer and one or more retailers. The receipt viewing and management interface may be integrated with or separate from any mobile payment interface and coupon client interface.

1.7. Account Identifiers

Account identifier 132 is a series of characters and/or symbols that uniquely identifies consumer 135 or a consumer account associated with consumer 135. For example, account identifier 132 may identify a retailer's loyalty account, a consumer account with offer server 110 (as stored in data store 112), or both. In the latter case, for instance, account identifier 132 may have been created to identify the retailer's loyalty account, but then subsequently registered with the offer server account, along with potentially other identifiers. Account identifier 132 may or may not also identify or be identified from a physical item, such as a card or personal computing device. In an embodiment, the physical item is any portable item that has an account identifier that can be readily accessed during a transaction.

In an embodiment, account identifier 132 is a number for a card account, such as a credit card account or consumer loyalty card account. Consumer 135 may provide identifier 132 during a transaction by, for example, scanning the card at a card reader, typing or stating the numbers on the card, or providing personal information by which the card number may be located, such as a telephone number.

In an embodiment, account identifier 132 is emitted wirelessly by a radio-frequency identifying (RFID) chip or any other mechanism capable of transmitting signals that may be detected during a transaction with retailer 145. For example, the RFID chip may be embedded within a card, device, or other item carried by consumer 135. The RFID chip may be, for example, a passive NFC tag or active NFC reader.

1.8. Variations and Alternatives

System 100 as shown in FIG. 1 presents only one embodiment in which the techniques described herein may be practiced. Other embodiments may include additional and/or fewer elements, in potentially different arrangements. As an example, any of offer provider, offer server 110, or retailer 145, may be the same entity, and various other components may therefore be omitted. Furthermore, various processes, such as generating and sending electronic receipts or locating consumer account information, may be performed by a server provided by yet a different entity, such as a payment provider or shopping incentive provider, that is not depicted in FIG. 1.

In an embodiment, retail server 140, offer server 110, or any other server described herein may include or be coupled to a variety of different components for implementing the techniques described herein, including database server(s), email or text messaging server components such as an SMTP server component, and web/application server components for responding to requests addressed to various addresses and ports with web pages and/or other data. Web/application server components may rely upon any suitable protocol or application language, including HTTP, HTTPS, SSL, HTML, XML, PHP, Java, JavaScript, SOAP, and so forth.

2.0. Completing Bifurcated Transactions

Figure 2A:
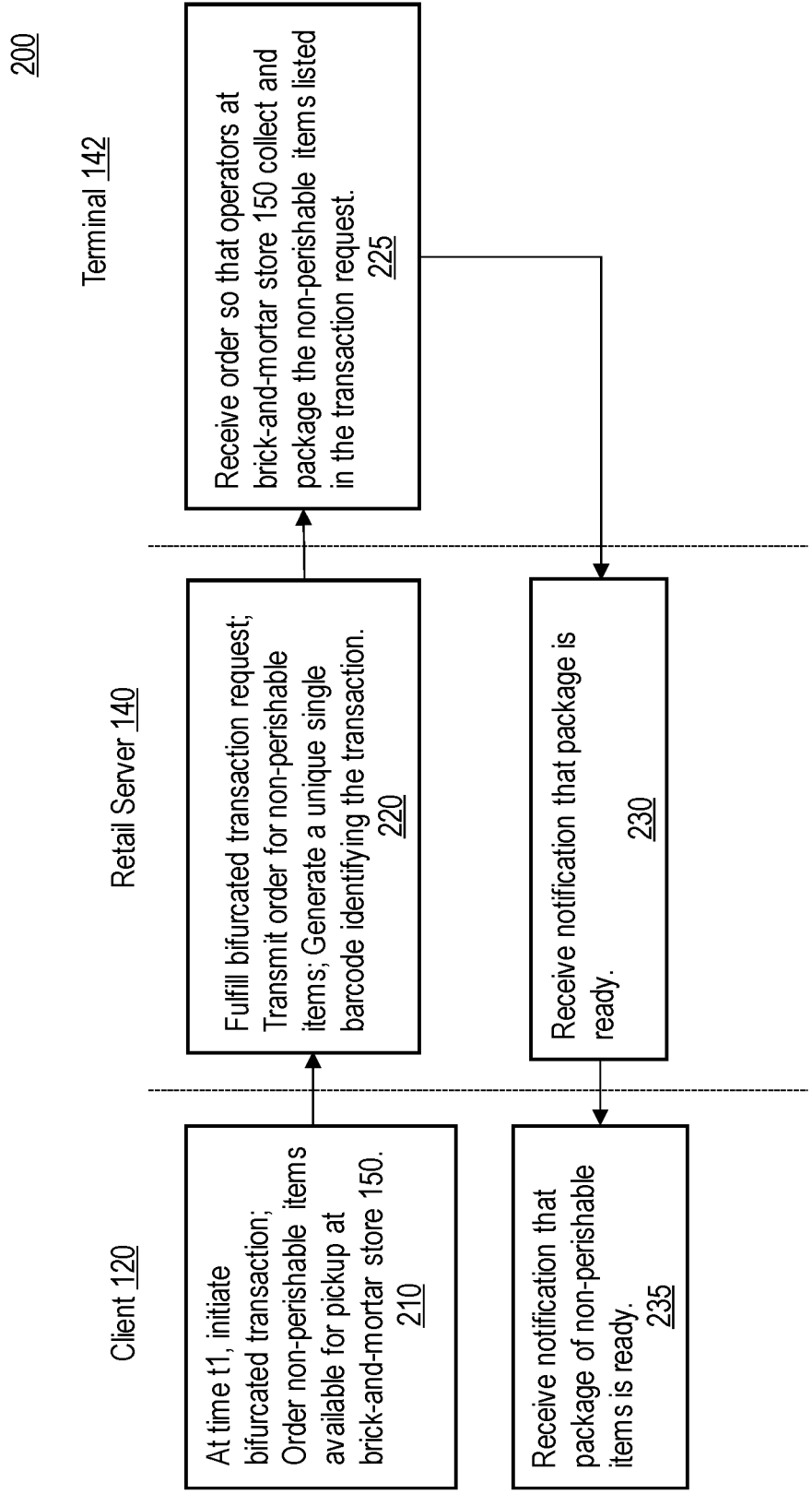

FIG. 2A and FIG. 2B illustrate a method flow 200 for completed a bifurcated transaction at a brick-and-mortar store 150, according to an embodiment.

Flow 200 starts at block 210 with user 135 using client 120 at time t1 to electronically initiating a bifurcated transaction for one or more non-perishable products available for purchase at a particular brick-and-mortar store 150 using a website, mobile application, and/or other user interface provided by retail server 140. User 135 may be logged into retail server 140 using one or more login credentials associated with a user account maintained by retail server and stored in data store 112. For example, user 135 may provide their username, retailer loyalty account information, a unique account identifier etc. and/or account authentication information, such as password, pin, security answers etc. to successfully log in. User 135 uses the user interface to peruse, select, or otherwise specify a subset of non-perishable items for purchase from a set of non-perishable items that is available for purchase at the particular brick-and-mortar store 150. For example, user 135 may add one or more non-perishable items to an online shopping cart and check out, or set up a recurring order of one or more non-perishable items, and so on.

The purchase request includes product identification information for one or more non-perishable items and respective quantities. Optionally, the purchase request may further include payment information, such as credit card, gift card, coupons, etc. Optionally, the purchase request may further include instructions by user 135 as to a time window during which the user will pick up the purchased non-perishable items at brick-and-mortar store 150. Optionally, purchase request may further include instructions by user 135 as to storage of the purchased non-perishable items. For example, the user may specify that the purchased non-perishable items be stored in a locker at brick-and-mortar store 150, in which case the user may further specify a locker code. In one embodiment, a user may store a locker code in their user account (stored in data store 112) for use in all transactions comprising user's purchase of non-perishable items via retail server 140.

Block 220 comprises receiving the user's purchase request of non-perishable items at retail server 140. In response to receiving the user's purchase request, retail server 140 fulfills the user's purchase request and performs the following: (i) creates a new transaction record for the transaction, (ii) updates a user account associated with user 135 to include indication of the transaction, (iii) sends instructions to brick-and-mortar store 150 and/or terminal 142 to causes operators (machine, human, or both) at brick-and-mortar store 150 to search a non-perishable item warehouse at brick-and-mortar store 150 and collect the non-perishable items included in the user's purchase request, and (iv) generates a unique machine-readable label (e.g., a barcode, a QR code, etc., hereafter referred to as a "barcode") identifying the user's purchase request. In one embodiment, the barcode is appended with a human-readable label identifying the user 135, such as the first two letters of the users' last name and a first two letter of the user's first name, so that it is easy for user 135 to identify their package/shopping cart. Retail server 140 stores the barcode in a transaction record for the transaction. In another embodiment, the barcode is appended with the number of non-perishable items being purchased (e.g., 3) so as to prevent theft by user 135 by adding additional items to their package of non-perishable items.

Retail server 140 may further causes the barcode to be printed at a printer (e.g., printer 149) at brick-and-mortar store 150 to be affixed to a package of the collected non-perishable items. Retail server 140 may further instruct the operators to place the package in a locker or shopping cart as specified by the user 135 in his/her purchase request.

At block 225, in response to retail server fulfilling the user's purchase request, operators (machine, human, or both) at brick-and-mortar store 150 search a non-perishable item warehouse at brick-and-mortar store 150 and collect the non-perishable items included in the user's purchase request. A package of these non-perishable items is generated and prepared for pickup by user 135 in a user-requested manner. Thus, the non-perishable items may be placed in a box with the barcode on the box. The box may be placed in a locker or a shopping cart. The non-perishable items may be placed directly into a box or shopping cart without being placed in a box, with the barcode being displayed on the box or shopping cart.

In some embodiments, where the user 135 has not provided any instructions as to the manner of pickup of non-perishable items, operators at brick-and-mortar store 150 may follow default practices regarding placement of packages of non-perishable items designed to make it easy for the consumer 135 to both pick up his/her package and make his/her purchase of perishable items at brick-and-mortar store 150 in a time-efficient manner. In one example, a default practice may be placement of the package in a shopping cart towards consumer entrance at brick-and-mortar store 150 with the barcode attached to the shopping cart. In one embodiment, the bar code is printed and attached to the shopping cart via tape. In another embodiment, the bar code is printed and attached to a non-perishable item placed in shopping cart, e.g. via tape. In yet another embodiment, the shopping cart is capable of communication with retail server 140 and/or terminal 142 to display the barcode in a display section, as further discussed with reference to FIG. 6. In yet another embodiment, the shopping cart is prevented from moving, e.g., by locks on its wheels, until the user 135 mobilizes the shopping cart.

At block 230, optionally, retail server 140 receives an indication from terminal 142 that the package is ready, and it may then send appropriate notification to client 120 at block 235. For example, if the user 135 had requested the package of non-perishable items be placed in a locker, then a notice that the package is placed in a locker with a locker number may be transmitted to client 120. For example, client 120 may receive a message: "Congratulations! Your items are waiting for you in locker 15."

Block 240 starts with user 135 physically visiting brick-and-mortar store 150 at a time t2 subsequent to time t1 and locates his/her package of non-perishable items. The user 135 may visit the brick-and-mortar store 150 at a time subsequent to the time when they placed the order in block 210. At the brick-and-mortar store 150, as mentioned earlier, the default setting may be that the shopping cart is placed close to the consumer entrance at brick-and-mortar store 150 so that the consumer 135 may collect their shopping cart. In one embodiment, the consumer 135 locates the correct shopping cart by scanning the barcode attached to or displayed on the shopping cart via client 120. The scanned information is sent to retail server 140, at block 245, which determines if there is a match between the scanned barcode and the barcode saved in the transaction record for the user 135 and client 120 associated with user 135.

If the user 135 has located the right barcode, retail server 140 may cause appropriate notification to appear notifying the user 135 that they have located their order at block 250. In one embodiment, the notification appears in client 120. For example, client 120 may receive a message: "Congratulations! You have found your items." Alternatively, or in addition, retail server 140 may cause an appropriate notification to appear on the shopping cart itself in its display 6103. Further, if the user 135 has located the right barcode, retail server 140 may cause the shopping cart to be mobilized, e.g., by releasing the locks on the cart's wheels, if locked. Alternatively, if the non-perishable items (or package thereof) is placed in a locker, then user 135 may use their locker pin to access the locker.

At block 260, user 135 collects their non-perishable items/shopping cart and peruses the perishable items at brick-and-mortar store 150 and adds one or more perishable items to the shopping cart, and approaches terminal 142.

At block 270, terminal 142 scans the non-perishable item barcode. Note that a single barcode is scanned to process the purchase of any number of non-perishable items that the user 135 placed an order for at block 210. This can save considerable time in the checkout process. In addition, scanning the non-perishable item barcode also pulls up information associated with user 135 from the customer record in data store 112 (via retail server 140), such as user name, payment information, stored offers, etc. At block 270, terminal 142 scans the one or more perishable items in the shopping cart added by the user at block 260. At block 275, terminal 142 simultaneously processes payment for the bifurcated transaction by either applying tender provided by user 135 or by applying payment information stored in the user's customer record (e.g., credit card, gift card, coupons, etc.).

At block 280, retail server 140 updates and completes the transaction record to include the perishable items purchased, time of checkout, payment type, etc. Terminal 142 and/or retail server 140 provide a receipt for the now completed transaction. In one embodiment, the receipt includes information regarding both parts of the user's transaction: non-perishable items ordered prior to the user's visit to brick-and-mortar store 150 and perishable items added to user's shopping cart while at the brick-and-mortar store 150. Receipt is discussed further with respect to FIG. 3 and FIG. 4 below.

3.0. Providing Receipts

FIG. 3 illustrates a method flow 300 for providing a receipt for a transaction conducted at least partially at a brick-and-mortar store, according to an embodiment.

Block 310 comprises scanning the single barcode for the non-perishable items ordered by user 135 prior to the user's visit to brick-and-mortar store 150 and receiving transaction information from retail server 140. The transaction information includes information for the online transaction comprising non-perishable items. The transaction information includes account identifying information. The transaction information may also include various transaction details, such as a total price, a list of items purchased, information about offers or other discounts applied to the transaction, and so forth. The transaction information received from retail server 140 is added to the in-store transaction information, which comprises the user's purchase of perishable items (such as, fruits, vegetables, milk, etc.) to generate a complete transaction record.

The granularity of the transaction information provided on the receipt may vary from retailer to retailer, but in one embodiment, includes detailed line-item descriptions of each item purchased. In an embodiment, the transaction information may include pre-formatted receipt data or templates, to which offer information may be added. In an embodiment, the transaction information contains no such formatting. The account identifying information may be, for instance, a consumer identifier, or an account number retrieved using the consumer identifier.

Block 320 comprises identifying, at the retail server 140, an account associated with the account identifying information. Block 320 may involve querying one or more databases 112 for account information. Block 320 further comprises identifying an electronic address associated with the account.

Block 330, which is optional, comprises selecting one or more offers for which the consumer is eligible. Block 330 may involve querying an offer database, either directly or via an offer server 110, to retrieve offers. In an embodiment, a variety of non-behavioral targeting mechanisms may be used to select the one or more offers, such as random algorithms, timestamps, campaign targets, and so forth. In an embodiment, the criteria used to select offers may be associated with various aspects of the transaction information, such as keywords selected from item descriptions and item identifiers. In an embodiment, the one or more offers may be selected based upon one or more of: the one or more items involved in the transaction, transaction date and/or time, amount spent, consumer preferences, retailer preferences, consumer purchase history, retailer identity, store location, or consumer offer redemption history. In an embodiment, only a certain number of offers may be selected. To this end, block 330 may comprise ranking offers or requesting that an offer server rank offers according to criteria such as described above. In an embodiment, the selected offers may be limited to those having a certain score in a ranking function. Any suitable techniques for selecting and ranking offers may be utilized.

Block 340 comprises generating a receipt based on the transaction information, such as depicted in FIG. 4. Block 340 may therefore entail formatting both the transaction information and optional offer information as a receipt. The formatting may be done in conformance with template data and/or logic for structuring an electronic receipt based on the transaction information. In an embodiment, the c receipt may include logos, slogans, text, and links uploaded or otherwise provided by the retailer for use in all of the retailer's receipts. In an embodiment, the offer information included in the generated receipt may include one or more links to a website or other resource at which detailed information about offers may be obtained, specific information about offers selected per block 330, and/or links for obtaining coupons for specific offers.

Block 350 comprises providing the receipt, with the offer information, via printout, an electronic address associated with the account, and/or storing in the consumer's account. Block 350 may involve, for example, sending an email with the offer information to an email address that is stored in association with the account. Block 350 may alternatively involve receiving a client request directed a particular URL and responding to the request with an electronic receipt. The particular URL may be, without limitation, a URL that was emailed or texted to the consumer, the URL of a page displayed by a coupon web application upon the consumer logging into the web application, a URL corresponding to the transaction in a transaction history for the consumer, or a URL corresponding to XML-based data that is fed to a mobile application operated by the consumer. The electronic receipt may have been generated prior to receiving the request from the client. Alternatively, the transaction data may be stored in a database. In response to the consumer requesting the particular URL from the server, the server dynamically generates the electronic receipt per block 340, using the stored transaction data. Block 330 may also be performed prior to or in response to the request for the particular URL.

In an embodiment, the offer information includes or links to other information that includes an identification of one or more mechanisms by which the consumer may cause one or both of printing one or more coupons for the one or more offers or saving one or more digital coupons for the one or more offers to the account associated with the consumer identifier. The mechanisms may involve, for instance, one or more URLs that request that an offer server generate a coupon for the selected offer. In an embodiment, the offer information includes printable copies of the one or more offers. In an embodiment, one or more digital coupons are generated in block 330 and saved to the consumer's account. Block 350, then, comprises informing the consumer of the existence of the digital coupons in the consumer's account.

Flow 300 provides one example of the variety of possible techniques for electronically providing offer information in association with a receipt for a transaction. Other techniques may involve additional or fewer elements, in varying orders. For example, in an embodiment, the electronic address is received directly from the terminal 142 or retail server 140. The account identifying information and the account itself may therefore be unnecessary.

3.1. Receipts

Various embodiments involve providing consumers at brick-and-mortar stores with electronic receipts instead of, or in addition to, printed receipts. The receipts may be provided to the consumers in a variety of ways. For example, the receipt may be included in or attached to an email. Or, the receipt may be provided in a web page on a website hosted by the retail server 140 or a third-party, such as an account history page or "digital locker" of receipt data. In an embodiment, the consumer may access the web page at any time after the transaction by logging into the website using credentials that authenticate the consumer. In an embodiment, the consumer receives a link to the web page via email, a text message, or any other electronic address, including private messaging addresses on social networks. The consumer provides a suitable address for the receipt during the transaction. Or, the consumer provides an identifier, such a store loyalty card or RFID tag, to the retailer so that a suitable electronic address to which to provide the electronic receipt may be located.

As yet another example, the consumer may obtain an electronic receipt using a dedicated transaction management application. The dedicated transaction management application, which may also double as a payment application and/or coupon application, may communicate with a server to obtain receipt data that has been uploaded by retailers in association with an account belonging to the consumer. The application may then organize that receipt data for presentation to the consumer. In an embodiment, the transaction management application may monitor the account for new receipts periodically or receive push-notifications of receipts from the server. The receipt management application may then notify the consumer when a new receipt is available.

Various embodiments may also or instead involve providing consumers with offer information via an electronic address in response to the completion of a transaction. The offer information may include digital coupons themselves, and/or links to locations at which the consumer may print or otherwise obtain coupons. In an embodiment, offer information is embedded in an electronic receipt.

In an embodiment, an electronic/digital receipt interface includes a control for printing a return receipt. In response to a consumer clicking on the control, a return receipt, including a transaction identifier barcode, is printed.

In an embodiment, a retailer or payment provider creates receipts by requesting receipt data structures from a receipt server (not shown) and then formatting the receipt data structures in accordance with retailer-customized templates. In an embodiment, the retailer instead provides suitable template(s) to the retail server. Different templates may be used for different contexts, such as email as opposed to web page as opposed to SMS.

In an embodiment, an example template for a receipt divides a receipt into five sections, including: a header information section comprising store information and branding, general transaction information, and a receipt barcode; an item details section that lists the products purchased, including information such as UPCs, SKUs, descriptions, prices, price modifiers, quantities, and/or other suitable line item details; a totals area, including sub totals, tax totals, balance due, and total savings; a tender area comprising information about the form(s) of payment, and amount(s) of payment, and a trailer area allowing for terms of sale, branding, and loyalty greeting(s). In an embodiment, APIs allow a retailer or other entity to retrieve data structures corresponding to each of the above.

FIG. 4 depicts a display of a receipt 400 that has been provided to an electronic address 410 of a consumer. While FIG. 4 depicts the receipt 400 as being an electronic emailed receipt, the receipt may be in another form, such as via text message, printed on paper, etc.

Receipt 400 comprises transaction details 435, such as a transaction number, a time or date of the transaction, a store location at which the transaction took place, an identifier for a terminal at which the transaction took place, the name of a sales representative that assisted in conducting the transaction, the name of the consumer, and so forth. Receipt 400 comprises an item list 440 comprising each and every item 441-445 that was purchased in the transaction. Thus, the consumer's entire purchase is listed, including all perishable items and non-perishable items with their respective quantities. In the example receipt 400, user purchased four non-perishable item types 441-444, and one perishable item type 445. As discussed above, according to one embodiment, a single barcode is scanned for the entire set of non-perishable items. Accordingly, to generate receipt 400, at terminal 142, only two scans would have been necessary: one for the set of four non-perishable item types 441-444, and one for the single perishable item 445.

Item list 440 may include, in association with items 441-445, basket-level details such as the quantities of each item purchased, a price for each item, offer redemption data 470 for offers applied to the transaction, tax data, SKU numbers, and so forth. Receipt 400 further includes a transaction total 480, and payment data 490, which contains a list of each payment mechanism applied to the transaction, along with any balance remaining. In the example receipt 400, the user paid with two payment types: cash and credit card. In some embodiments, the payment type (e.g., credit card, gift card, other types of electronic payment) may be presented by the consumer at the point of sale, while in others, these may be stored in association with the consumer's account and used to pay for all or part of the purchase.

In some embodiments, offer information 451-452 is intermingled within item list 440. Specifically, offer link 151 is displayed after item 142 and offer link 152 is displayed after item 145. As depicted, the offer(s) associated with links 151 and 152 are selected at random. However, in other embodiments the offers associated with offer information 151-152 may have been selected for inclusion in receipt 400 based on items 142 and 145, respectively. Offer information 153 is displayed in association with payment information 190, and the offer associated therewith may have been selected for inclusion in all receipts provided via email. Alternatively, in an embodiment, offer information 153 may have been selected for inclusion in email 100 because of the payment method chosen by the consumer. Offer information 154 is displayed at the end of the email, and the corresponding offer may have been selected for any of a number of reasons as discussed herein. In other embodiments, offer information 151-154 may be entirely intermingled with the electronic receipt 400, or displayed entirely separate from the electronic receipt 400.

As depicted, offer information 151-154 includes a link to the location(s) of one or more offers, along with short description(s) of the offer(s) available on those pages, designed to encourage the consumer to click on the links. Each offer link 151-154 may link to a same or different location. For example, each link may take the consumer to a different offer page on the website of an offer provider. Each offer page may comprise one or more offers relevant to the selected link. Or each link may take the consumer to a same page containing all of the indicated offers.

In other embodiments, offer information 151-154 may include additional information about the available offers, such as a list of eligible products and store locations, expiration dates, discount amounts, and other terms. In an embodiment, offer information 151-154 may include controls associated with each indicated offer, such as a "Print now" button or "Save to Card" button, by which the consumer may immediately download, print, and/or save a coupon for the indicated offer. In an embodiment, offer information 151-154 may be part of a form comprising a checklist or pull-down menu of offers and controls for printing, saving, or otherwise accessing coupons for any offer that the consumer selects via the form. In an embodiment, offer information 151-154 may indicate to the consumer offers that have automatically been added to the consumers' account in response to the transaction.

Email 100 may optionally include relevant advertisement data, such as advertisement 180, that is not an offer. For example, as depicted, advertisement 180 is a special promotion that provides the consumer with access to a multimedia item related to the purchased item 143.

Email 100 is one example of a technique for providing a consumer with an electronic receipt. In other embodiments, the electronic receipt may be embedded in differently formatted emails, other types of messages, web pages, and/or documents. Furthermore, electronic receipt 400 may include more or less transaction data, in varying arrangements. In an embodiment, email 100 comprises only electronic receipt 400 or only offer information 151-154. In an embodiment, the information in email 100 may be divided amongst multiple electronic addresses. For example, the offer information 151-154 may be in a different email or on a web page. In an embodiment, the offer information 151-154 is substituted in email 100 with single link having a label such as "Access Your Coupons."

3.2 Brick-and-Mortar Store

Figure 5:
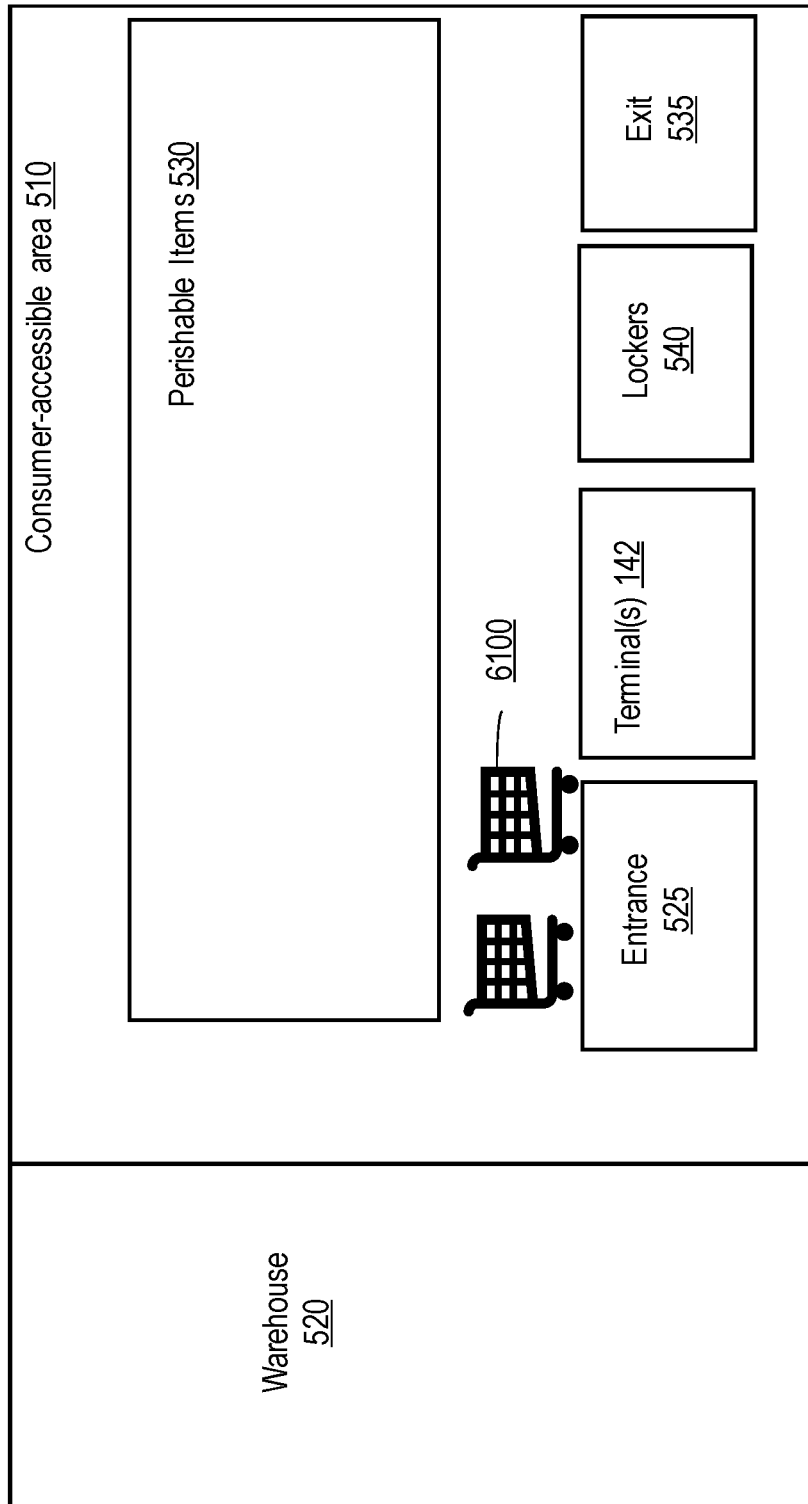
FIG. 5 illustrates a brick-and-mortar store configured to implement certain embodiments, in accordance with an embodiment.

FIG. 5 illustrates a block representation of a brick-and-mortar store 150 according to one embodiment. Brick-and-mortar store 150 is separated into two areas: a consumer accessible area 510 and a warehouse of non-perishable items 520 that is not accessible to consumers. Area 510 includes a consumer entrance 525, one or more aisles 530 of perishable items, checkout area including one or more terminals 142, a consumer exit 535 and optionally lockers 540. As illustrated, shopping carts 6100 with packages of non-perishable items are placed near consumer entrance 525. The warehouse 520 is used for fulfilling user's orders for non-perishable items. The layout enables user 135 to spend most of their time inside the brick-and-mortar store 150 shopping for perishable items and very little time shopping for non-perishable items, as most of the time consumption for the latter is done prior to the user 135 entering the brick-and-mortar store 150. Also, the time taken to check out at terminal 142 is reduced as the number of items that needs to be checked out is limited to the number of perishable items added to the shopping cart by the user 135 and a scan of the barcode. This leads to shorter lines at checkout, which enhances the user's shopping experience.

3.3 Shopping Cart

Figure 6:
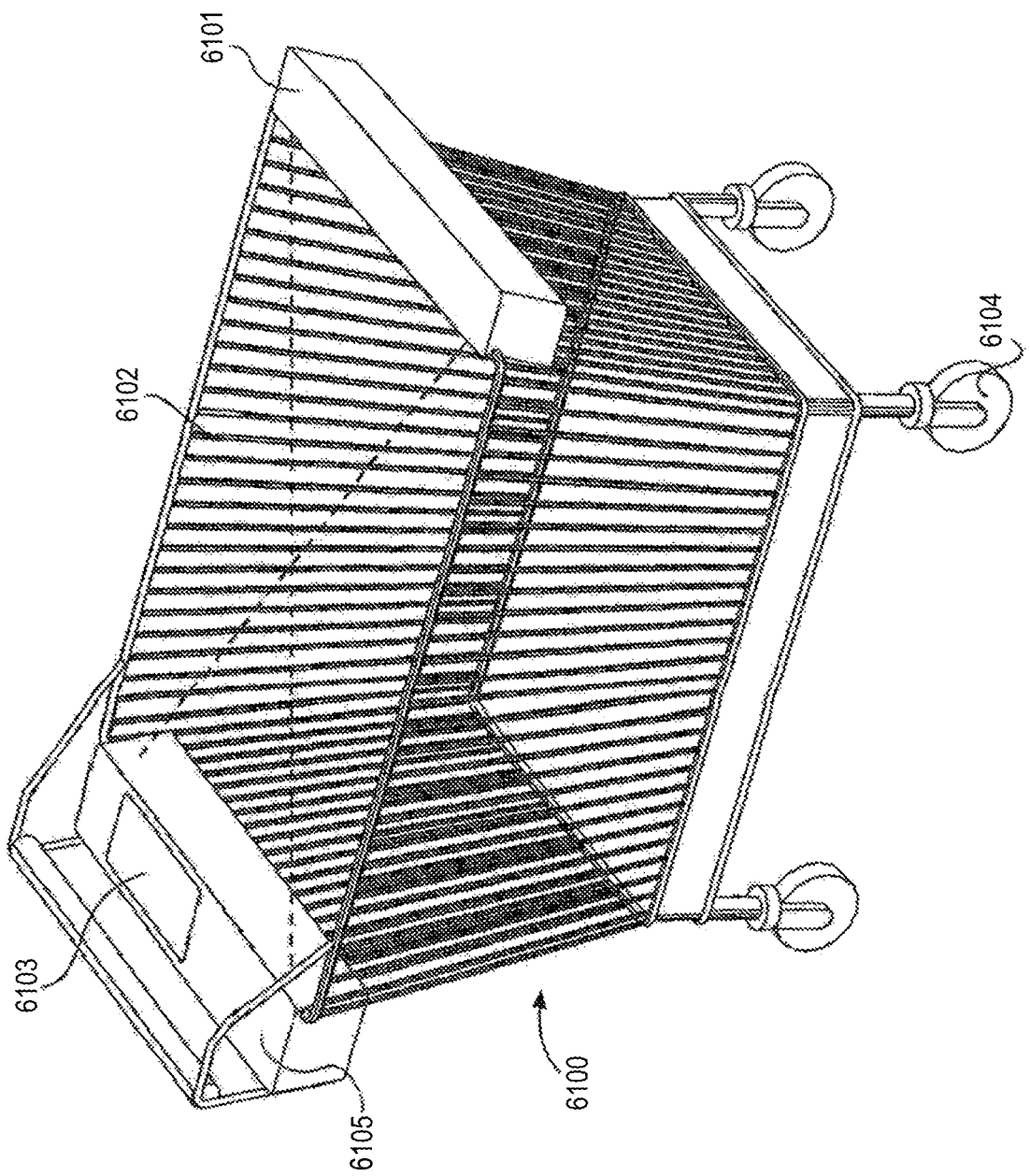
FIG. 6 illustrates a shopping cart in accordance with an embodiment.

FIG. 6 illustrates a shopping cart 6100 according to one embodiment. Shopping cart 6100 includes a body 6102, wheels 6104, a network interface 6105 communicatively coupled to retail server 140 and/or terminal 142, a display 6103, and optionally a sensor 6101. In one embodiment, network interface 6105 receives a barcode and/or user notification messages for displaying in display 6013. User notification messages may indicate an identity of user 135 so that user 135 can select the correct shopping cart.

4.0. Implementation Mechanism—Hardware Overview

According to one embodiment, the techniques described herein are implemented by one or more data processing systems, including general-purpose computing devices or special-purpose computing devices.

In general, data processing systems that may be used in connection with various embodiments include a desktop computer, laptop computer, netbook, electronic notebook, ultra mobile personal computer (UMPC), electronic tablet or similar device (including any tablet using an iOS™ operating system released by Apple Computer™, Android™ operating system released by Google Inc.™ or Windows™ operating system released by Microsoft Corporation™), client computing device, client terminal, client console, server computer, server system, server terminal, cloud computing system, parallel processing or other distributed computing system, virtual machine, remote computer, mobile telephone, smartphone or similar device (including any smartphone using an iOS™ operating system released by Apple Computer™, Android™ operating system released by Google Inc.™ or Windows™ operating system released by Microsoft Corporation™), wearable computer, head mounted computer or display, personal digital assistant, personal digital organizer, handheld device, networking device, or any other device, component, module, subsystem or system capable of processing electronic data, or any combination of the foregoing.

Data processing systems that may be used in connection with various embodiments may be hard-wired to perform the techniques, or may include digital electronic devices such as one or more application-specific integrated circuits (ASICs) or field programmable gate arrays (FPGAs) that are persistently programmed to perform the techniques, or may include one or more general purpose data processors programmed to run software, including program instructions in firmware, memory, other storage, or a combination. Such data processing systems may also combine custom hard-wired logic, ASICs, or FPGAs with custom programming to perform their functions.

In various embodiments, a data processing system may include one or more logic modules, sometimes also denoted data processing modules or modules. In various embodiments, a logic module may consist of (a) any software application, (b) any portion of any software application, where such portion can process data, (c) any data processing system, (d) any component or portion of any data processing system, where such component or portion can process data, and (e) any combination of the foregoing. In general, a logic module may be configured to perform instructions and to carry out the functionality of one or more embodiments, whether alone or in combination with other data processing modules or with other devices or applications. In general, a data processing system may include one or more logic modules. Depending on the implementation, a logic module may be construed itself to be a data processing system in terms of architecture, configuration, functionality, performance and/or other attributes.

As an example of a logic module comprising software, a logic module may consist of, or may include a software application, and the software application may itself consist of one or more software programs and/or software modules. A logic module consisting of software may perform one or more functions if loaded on a data processing system that comprises a processor or on a logic module that comprises a data processor.

As an example of a logic module comprising hardware, a data processor, a dynamic memory and a storage memory may be included in a logic module to provide a hardware execution platform for software. Examples of data processing systems that may incorporate both logic modules comprising software and logic modules comprising hardware include a desktop computer, a mobile computer, a handheld device, or a server computer, each being capable of running software to perform one or more functions defined in the respective software.

In various embodiments, functionality of logic modules may be consolidated in fewer logic modules (e.g., in a single logic module), or may be distributed among a larger set of logic modules. For example, separate logic modules performing a specific set of functions may be equivalent with fewer or a single logic module performing the same set of functions. Conversely, a single logic module performing a set of functions may be equivalent with a plurality of logic modules that together perform the same set of functions. In various embodiments, two or more logic modules may be independent modules and may perform specific functions independent of each other or may be combined in whole or in part in a single module that singularly performs their combined functionality.

In one embodiment, the functionality of one more logic modules may be distributed among any number of logic modules. One way to distribute functionality of one or more original logic modules among substitute logic modules is to reconfigure the software and/or hardware components of the original logic modules. Another way to distribute functionality of one or more original logic modules among different substitute logic modules is to reconfigure software executing on the original logic modules so that it executes in a different configuration on the substitute logic modules while still achieving substantially the same functionality. Examples of logic modules that may incorporate the functionality of multiple logic modules and therefore can be construed themselves as logic modules include a system-on-a-chip (SoC) device and a package-on-package (PoP) device, where the integration of logic modules may be achieved in a planar direction (e.g., a processor and a storage memory disposed in the same general layer of a packaged device) and/or in a vertical direction (e.g. using two or more stacked layers).

Figure 7:
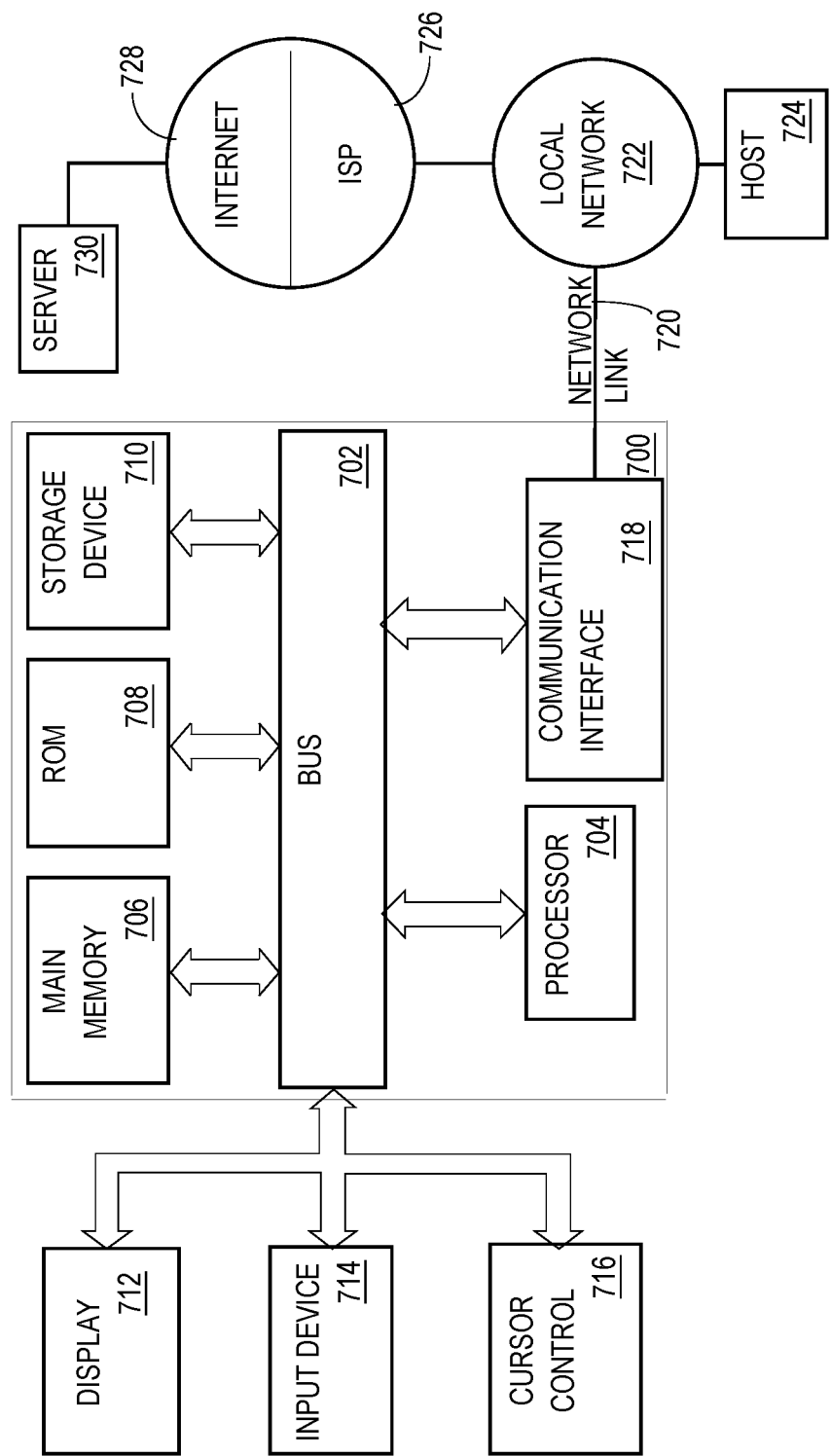
FIG. 7 is block diagram of a data processing system upon which embodiments of the disclosure may be implemented, in accordance with an embodiment.

For example, FIG. 7 is a block diagram that illustrates a data processing system 700 that may be used in connection with various embodiments. Data processing system 700 includes a bus 702 or other communication mechanism for communicating information, and a data processor 704 coupled with bus 702 for processing information.

A data processor, such as the data processor 704 from FIG. 7, sometimes denoted processor, represents one or more general-purpose data processing devices such as a microprocessor or other central processing unit. A data processor may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets, whether in a single core or in a multiple core architecture. Data processor 704 may also be or include one or more special-purpose processing devices such as an application specific integrated circuit (ASIC), a field programmable gate array (FPGA), a digital signal processor (DSP), network processor, any other embedded processor, or the like. The data processor 704 may execute instructions for performing operations and steps in connection with various embodiments.

Data processing system 700 may also include a main memory 706, such as a dynamic memory designed to provide higher data access speeds, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render data processing system 700 into a special-purpose machine that is customized to perform the operations specified in the instructions. Examples of main memory 706 include dynamic random-access memory (DRAM), synchronous DRAM (SDRAM) memory, read-only memory (ROM) and flash memory. The main memory 706 may be adapted to store all or part of the instructions of a software application, as these instructions are being executed or may be scheduled for execution by data processor 704. In some implementations, the main memory 706 may include one or more cache memory systems that are designed to facilitate lower latency data access by the data processor 704.

Data processing system 700 may further include a read only memory (ROM) 708 and/or a storage device 710 coupled to bus 702.

In general, the storage device 710, also sometimes denoted a storage memory, may be designed to store larger amounts of data. Examples of such storage memories include a magnetic hard disk and a flash memory module. In various implementations, a data processing system may also include, or may otherwise be configured to access one or more external storage memories, such as an external memory database or other memory data bank, which may either be accessible via a local connection (e.g., a wired or wireless USB, Bluetooth, or Wi-Fi interface), or via a network (e.g., a remote cloud-based memory volume).

In general, the terms "memory," "memory medium," or "memory device" could be used to refer to any computer readable storage medium, storage memory, dynamic or static memory, or other memory device, including the main memory 706, the ROM memory 708 and the storage device 710 shown in FIG. 7. A memory may include any chip, disk, device, combination of chips and/or devices, or other structure capable of storing electronic information, whether temporarily, permanently or quasi-permanently. A memory could be based on any magnetic, optical, electrical, mechanical, electromechanical, MEMS, quantum, or chemical technology, or any other technology or combination of the foregoing that is capable of storing electronic information. Examples of memory include a magnetic hard disk, a random-access memory (RAM) module, an optical disk (e.g., DVD, CD), a flash memory card, stick, disk or module, or any combination of one or more of the foregoing. A memory could be centralized, distributed, local, remote, portable, or any combination of the foregoing. A memory could consist of a stand-alone or discrete memory storage device or could be an array of distributed storage devices.

A software application or module, and any other computer executable instructions, may be stored on any such memory, whether permanently or temporarily, including on any type of disk (e.g., a floppy disk, optical disk, CD-ROM, and other magnetic-optical disks), read-only memory (ROM), random access memory (RAM), EPROM, EEPROM, magnetic or optical card, or any other type of media suitable for storing electronic instructions.

In general, a memory could host a database, or a part of a database. Conversely, in general, a database could be stored completely on a particular memory, could be distributed across a plurality of memories, or could be stored on one particular memory and backed up or otherwise replicated over a set of other memories. Examples of databases include operational databases, analytical databases, data warehouses, distributed databases, end-user databases, external databases, hypermedia databases, navigational databases, in-memory databases, document-oriented databases, real-time databases and relational databases. One or more databases could be stored in a data farm or in cloud memory system.

A memory may store one or more software applications, in whole or in part. In general, a software application, also denoted a data processing application or an application, may include any software application, software module, function, procedure, method, class, process, or any other set of software instructions, whether implemented in programming code, firmware, or any combination of the foregoing. A software application may be in source code, assembly code, object code, or any other format. In various implementations, an application may run on more than one data processing system (e.g., using a distributed data processing model or operating in a computing cloud), or may run on a particular data processing system or logic module and may output data through one or more other data processing systems or logic modules.

Data processing system 700 may be coupled to a display 712, possibly via bus 702. Display 712 enables a user to visualize data output by the data processing system 700 and/or to interact with the data processing system 700. The display 712 may directly or indirectly provide a graphical user interface (GUI) adapted to facilitate presentation of data to a user and/or to accept input from a user. The display 712 may represent one or more stand-alone, integrated, external or remote displays, including any LCD, LED or CRT display, optical projection device, holographic displays, wearable personal display (e.g. an electronic eye wear display), or of a combination of the foregoing.

A visual display may also be denoted a graphic display, computer display, display, computer screen, screen, computer panel, or panel. Other examples of displays include a computer monitor, an integrated computer display, electronic paper, a flexible display, a touch panel, a transparent display, and a three-dimensional (3D) display that may or may not require a user to wear assistive 3D glasses.

A data processing system may incorporate a graphic display. Examples of such data processing systems include a laptop, a computer pad or notepad, a tablet computer, a smartphone, an electronic reader (also denoted an e-reader or ereader), or a personal data assistant (PDA).

A data processing system may be connected to an external graphic display. Examples of such data processing systems include a desktop computer, a server, an embedded data processing system, or any other data processing system that does not itself include a display, but which produces data that may be shown to a user. A data processing system that incorporates a graphic display may also be connected to an external display. A data processing system may directly display data on an external display or may transmit data to other data processing systems or logic modules that will eventually display data on an external display.

Graphic displays may include an active display, passive display, LCD display, LED display, OLED display, plasma display, and any other type of visual display that is capable of displaying electronic information to a user. Such graphic displays may permit direct interaction with a user, either through direct touch by the user (e.g. a touch-screen display that can sense a user's finger touching a particular area of the display), through proximity interaction with a user (e.g., sensing a user's finger being in proximity to a particular area of the display), or through a stylus or other input device. In one implementation, the display 712 is a touch-screen display that displays a human GUI interface to a user, with the user being able to control the data processing system 700 through the human GUI interface, or to otherwise interact with, or input data into the data processing system 700 through the human GUI interface.

An input device 714, which may include a physical or virtual keyboard or other device for entering information, may also be coupled to bus 702 for entering information and command into data processing system 700. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Data processing system 700 may perform functionality in connection with various embodiments using customized hard-wired logic, one or more ASICs or FPGAs, firmware and/or software which help data processing system 700 function as a special-purpose machine. According to one embodiment, data processing system 700 achieves desired functionality in response to processor 704 executing one or more sequences of one or more instructions contained in a memory, such as main memory 706, ROM 708 and/or storage device 710. Such instructions may be read into main memory 706 from another storage medium, such as storage device 710. Execution of the sequences of instructions contained in a memory may cause processor 704 to perform the process steps described herein. In alternative embodiments, hard-wired circuitry may be used in place of or in combination with software instructions.

Other examples of a memory that may be used in connection with various embodiments to store information and/or software include non-transitory media that store data and/or instructions that cause a machine to operate in a specific fashion. Storage media that may be used as memory in connection with various embodiments may comprise non-volatile media and/or volatile media. Non-volatile media may include, for example, optical or magnetic disks. Volatile media may include dynamic memory. Common forms of computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

In various implementations, bus 702 may be implemented using a variety of transmission media, including metallic wires, optic connections, or wireless connections. In some implementations, there may be one or more data buses in addition to the data bus 702 that connect some or all of the components of data processing system 700, including possibly dedicated data buses that connect only a subset of such components. Each such data bus may implement open industry protocols (e.g., a PCI or PCI-Express data bus), or may implement proprietary protocols.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to data processing system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

The data processing system 700 may further include an audio interface, which provides the ability for the data processing system 700 to output sound (e.g., a speaker), to input sound (e.g., a microphone), or any combination of the foregoing. In some implementations, an audio port may be used to transmit data to and from the data processing system 700, either through sound wave modulation (e.g., emulating the operation of a microphone, although possibly in different frequency ranges and with different data encoding protocols), or through modulation of the electrical signals otherwise transmitted through the audio port (e.g., by using an input microphone port or headset connector port to transmit electrical signals that are properly encoded and/or modulated).

The data processing system 700 may further include any other components that may be advantageously used in connection with receiving, processing and/or transmitting information.

Data processing system 700 also includes a communication interface 718 coupled to bus 702. Communication interface 718 may provide a two-way data communication coupling to a network link 720 that is connected to a local network 722. For example, communication interface 718 may be an integrated services digital network (ISDN) card, cable modem, wireless modem, satellite modem, or a modem to provide a data communication connection to a corresponding type of telephone line. As another example, communication interface 718 may be a local area network (LAN) card to provide a data communication connection to a compatible LAN. Wireless links may also be implemented. In such an implementation, communication interface 718 may send and/or receive electrical, electromagnetic and/or optical signals that carry analog or digital data streams representing various types of information.

Network link 720 may provide data communication through one or more networks to other data devices. For example, network link 720 may provide a connection through local network 722 to a host computer 724 or to data equipment operated by an Internet Service Provider (ISP) 726. ISP 726 in turn may provide data communication services through the worldwide packet data communication network commonly referred to as the Internet 728. Local network 722 and Internet 728 may use electrical, electromagnetic and/or optical signals that carry digital data streams. The signals through the various networks and the signals on network link 720 and through communication interface 718, which carry the digital data to and from data processing system 700, are example forms of transmission media.

Data processing system 700 may send messages and/or receive data, including program code, through the network(s), network link 720 and communication interface 718. In the Internet example, a server 730 might transmit a requested code for an application program interface through Internet 728, ISP 726, local network 722 and communication interface 718. The received code may be executed by processor 704 as it is received, and/or stored in storage device 710, or other non-volatile storage for later execution.

In various embodiments, a data processing system, such as the data processing system 700, may communicate, via one or more communication channels and/or one or more communication networks, with local or remote peripherals, logic modules and/or data processing systems. For example, with reference to the data processing system illustrated in FIG. 7. such communications could be carried out through the communication interface 718, in which case the communication interface 718 and/or other logic modules could be configured to include the appropriate communication hardware and software logic to implement the appropriate data encoding, decoding, encryption, decryption, and/or other communication functionality.

In various embodiments, a data processing system may communicate directly with other data processing systems (e.g., a retail terminal communicating with a remote server) or with logic modules (e.g., a local credit card reader, a bar scanner, other point of sale peripherals, etc.) via one or more communication channels and/or via one or more networks.

In various embodiments, a communication channel may include any direct or indirect data connection path, including any connection using a wireless technology (e.g., Bluetooth, infrared, Wi-Fi, WiMAX, cellular, 3G, 4G, EDGE, CDMA and DECT), any connection using wired technology (including via any serial, parallel, wired packet-based communication protocol (e.g., Ethernet, USB, FireWire, etc.), or other wireline connection), any optical channel (e.g., via a fiber optic connection or via a line-of-sight laser or LED connection), and any other point-to-point connection capable of transmitting data.

In various embodiments, a network may include one or more communication channels. In general, a network, or data network, consists of one or more communication channels. Examples of networks include LANs, MANs, WANs, cellular and mobile telephony networks, the Internet, the World Wide Web, and any other information transmission network. In various implementations, a data processing system may include multiple interfaces and communication ports capable of connecting to multiple communication channels and/or networks.

In various embodiments, a data processing system may transmit information and/or receive information via one or more networks that facilitate communications at longer distances. In various embodiments, each network that facilitates data communications for data processing systems and logic modules may be, or may include, a 3G network, a 4G network, an EDGE network, a CDMA network, a GSM network, a 3GSM network, a GPRS network, an EV-DO network, a TDMA network, an iDEN network, a DECT network, a UMTS network, a WiMAX network, a cellular network, any type of wireless network that uses a TCP/IP protocol or other type of data packet or routing protocol, any other type of wireless wide area network (WAN) or wireless metropolitan area network (MAN), or a satellite communication channel or network. Each of the foregoing types of networks that could be used to transmit or receive information from data processing systems and logic modules utilizes various communication protocols, including protocols for establishing connections, transmitting and receiving data, handling various types of data communications (e.g., voice, data files, HTTP data, images, binary data, encrypted data, etc.), and otherwise managing data communications. In various embodiments, a data processing system may be configured to be compliant with one or more protocols used in a network, such that the respective data processing system can successfully connect to the network and communicate via the network with other data processing systems or logic modules.

In various embodiments, a data processing system may transmit information and/or receive information via one or more local networks that facilitate communications at shorter distances. For example, a data processing system (e.g., a point of sale checkout terminal) located in a retailer or other commercial facility may communicate with another data processing system (e.g., a customer's smartphone) and/or with a logic module (e.g., a point of sale peripheral) via a local area network (a LAN). In various embodiments, a local area network may be, or may include, a wired LAN (e.g., an Ethernet network, an optical network, etc.), or a local wireless network (e.g., a Wi-Fi network).

In one embodiment, a data processing system may communicate with another data processing system or logic module that is located in physical proximity through a personal area network. For example, a point of sale terminal may communicate with a loyalty card reader via a Bluetooth connection to receive information relating to the loyalty card, or may communicate with a customer's smartphone via a near field communication channel to transmit or receive a digital coupon or offer or customer identification data.

In one embodiment, a personal area network is implemented so that it has a limited distance range. An advantage of using a limited-range connection between one or more data processing systems and/or one or more logic modules is that two devices would have to be located in close proximity to be able to connect, which means that the security of communications can be correspondingly increased. It would be less likely that a hostile device could be brought on the premises and placed in close physical proximity of a data processing system used in connection with various embodiments to attempt to compromise the security of the data processing system.

In one embodiment, the personal area network has a high security level. In one embodiment, a high security level for the connection between a data processing system (e.g., a point of sale checkout terminal) and another data processing system (e.g., a customer's smartphone) or logic module (e.g., a point of sale peripheral) can be achieved by implementing a pairing mechanism before the two devices acknowledge each other and initiate trusted data communications. In one embodiment, a high security level for a personal area connection can be achieved by encrypting communications before the respective data processing systems and/or logic modules.

In various embodiments, examples of logic modules and/or data processing systems that may be in communication with a data processing system deployed in a retailer or other commercial facility include a peripheral device, such as a cash register, a coin dispenser, a credit card reader, a barcode scanner, a printer, a document scanner, an RFID receiver configured to receive payment-related information from an RFID-enabled device, an image recognition device capable of identifying an object, a photo camera, or a video camera. In various embodiments, there may be two or more peripheral devices, directly or indirectly communicated to a data processing system deployed in a retailer or other commercial facility.

In one embodiment, the personal area network used to transmit or receive information from a data processing system and/or logic module (e.g., a peripheral device) is a Bluetooth communication network. Bluetooth is a proprietary open wireless technology standard for exchanging data over short distances. The Bluetooth standard is managed by the Bluetooth Special Interest Group. Current Bluetooth specifications use frequency-hopping spread spectrum in the range 2,400-2,483.5 MHz. Other frequency use protocols and/or frequency bands may be used in alternative or future implementations.

In one implementation, more than one simultaneous connection is established between a data processing system and one or more other data processing systems or logic modules via a personal area network, which may increase the reliability and/or speed of the communications between the respective devices. In one embodiment, a single Bluetooth connection is established between two devices. In other embodiments, two or three simultaneous Bluetooth connection are established between two devices.

In various embodiments, a personal area network and/or a connection established between a data processing system and one or more logic modules is, or includes, one of the following: a piconet (e.g., an ad-hoc network linking two or more wireless devices over a short distance radius), a scatternet (e.g., an ad-hoc network consisting of two or more piconets), a wireless USB network or connection, a Z-Wave network or connection, a ZigBee network or connection, an infrared network or connection, a near field communication (NFC) network or connection, a radio-frequency identification (RFID) network or connection, an optical signal carrier network or connection (e.g., a connection using modulation of a light carrier (e.g., by an LED, diode or laser) as the basis for data transmission, or any other wireless network or connection that can transmit data with sufficient reliability, speed and security over a short distance.

In general, unless otherwise stated or required by the context, when used in connection with a method or process, data processing system, or logic module, the words "adapted" and "configured" are intended to describe that the respective method, data processing system or logic module is capable of performing the respective functions by being appropriately adapted or configured (e.g., via programming, via the addition of relevant components or interfaces, etc.), but are not intended to suggest that the respective method, data processing system or logic module is not capable of performing other functions. For example, unless otherwise expressly stated, a logic module that is described as being adapted to process a specific class of information will not be construed to be exclusively adapted to process only that specific class of information, but may in fact, depending on the circumstances, be able to process other classes of information and to perform additional functions (e.g., receiving, transmitting, converting, or otherwise processing or manipulating information).

Some of the embodiments described in this specification may be presented in terms of algorithms and symbolic representations of operations on data bits within a computer memory. In general, an algorithm represents a sequence of steps leading to a desired result. Such steps generally require physical manipulations of physical quantities. Usually, although not necessarily, these quantities take the form of electrical or magnetic signals capable of being stored, transferred, combined, compared, and otherwise manipulated using appropriate electronic devices. Such signals may be denoted as bits, values, elements, symbols, characters, terms, numbers, or using other similar terminology.

When used in connection with the manipulation of electronic data, terms such as processing, computing, calculating, determining, displaying, or the like, generally refer to the action and processes of a data processing system or logic module that manipulates and transforms data represented as physical (electronic) quantities within the registers and memory of such system or module, into other data similarly represented as physical quantities within the registers or memory of that system or module, or within the registers or memory of other data processing systems or logic modules.

Various embodiments may be implemented using an apparatus or machine that executes programming instructions. Such an apparatus or machine may be specially constructed for the required purposes or may comprise a general-purpose computer selectively activated or reconfigured by a software application.

Algorithms discussed in connection with various embodiments of the present disclosure are not inherently related to any particular computer or other apparatus. Various general-purpose systems may be used with programs in accordance with various embodiments, or it may prove convenient to construct more specialized apparatus to perform the required method steps. The required structure for a variety of these systems will appear from the description provided in connection with the various embodiments discussed herein. In addition, unless otherwise expressly stated, embodiments are generally not described with reference to any particular programming language, data transmission protocol, or data storage protocol, and a variety of programming languages, transmission or storage protocols may be used if appropriate under the circumstances.

As used in this specification, a set means any group of one, two or more items. Analogously, a subset means, with respect to a set of N items (where N is at least 2), any group of such items consisting of N-1 or less of the respective N items.

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension but are not intended to be limiting with respect to the scope of the disclosure as recited in the claims. Each such definition is intended to also capture additional equivalent items, technologies or terms that would be known or would become known to a person of average skill in this art as equivalent or otherwise interchangeable with the respective item, technology or term so defined.

Unless otherwise required by the context, the verb "may" or "could" indicates a possibility that the respective action, step or implementation may or could be achieved, but is not intended to establish a requirement that such action, step or implementation must occur, or that the respective action, step or implementation must be achieved in the exact manner described.

In the foregoing specification, embodiments of the disclosure have been described with reference to numerous specific details that may vary from embodiment to embodiment, and from implementation to implementation. The scope of the disclosure is described in the claims that issue from this disclosure, in the specific form in which such claims issue, including any subsequent correction, and is not intended to be limited to any particular embodiment or implementation beyond any limitations expressly defined in such claims. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of managing a bifurcated transaction, the method comprising:
   receiving, from a computing device, a first purchase request for the bifurcated transaction, the first purchase request including an order of one or more first items and account identifying information;
   generating a transaction record for the first purchase request;
   identifying a consumer account corresponding to the account identifying information;
   querying an offer database to select a set of offers for which the consumer account is eligible;
   storing the set of offers in the consumer account;
   communicating the first purchase request to a retail store at a store location based on address information stored in the consumer account; and
   notifying the computing device that a package of the one or more first items is ready for collection, wherein the package of the one or more first items is identified using a label;
   receiving a scan of the label, which indicates that the package of the one or more first items is collected;
   receiving an indication of a second purchase request of the bifurcated transaction, the second purchase request including one or more second items;
   retrieving offer information for an offer selected from the set of offers stored in the consumer account, wherein the offer information is based on one or more of the one or more first items, the one or more second items, a transaction date, a retailer identity, the store location and an offer redemption history for the consumer;
   based at least in part on the receiving the scan of the label and the receiving the indication of the second purchase request, updating the transaction record with the second purchase request;
   processing payment for the bifurcated transaction comprising the first purchase request including the order of one or more first items together with the second purchase request including the one or more second items;
   generating a receipt for the bifurcated transaction including a listing of the one or more first items, the one or more second items and the offer information for the selected offer;
   querying the offer database to select a new set of offers for the consumer account based on one or more of the one or more first items, the one or more second items and the retail location; and
   storing the new set of offers in the consumer account.

2. The method of claim 1, wherein the first purchase request includes a plurality of first items;
   wherein the label comprises a single machine-readable code;
   wherein the receiving the scan of the label comprises receiving the scan of the single machine-readable code, which indicates that the package of the plurality of first items is collected.

3. The method of claim 1, wherein the label includes the account identifying information.

4. The method of claim 1, further comprising, in response to receiving the scan of the label, retrieving the transaction record and consumer account information associated with the first purchase request.

5. The method of claim 4, wherein the processing payment for the first purchase request and the second purchase request further comprising processing payment using payment information included in the retrieved consumer account information.

6. The method of claim 4, further comprising:
   generating an electronic receipt of the now completed bifurcated transaction, the electronic receipt including a listing of the one or more first items and the one or more second items and the offer information for the selected offer;
   providing the electronic receipt for access by a consumer account identified by the retrieved consumer account information.

7. The method of claim 1, further comprising:
   determining whether the scan of the label corresponds to the transaction record;
   in response to determining that the scan of the label corresponds to the transaction record, transmitting a notification to the computing device that the package is collected.

8. One or more non-transitory computer-readable storage media having stored thereon instructions that, when executed by one or more processors, cause the one or more processors to perform operations comprising:
receiving, from a computing device, a first purchase request including an order of one or more first items and account identifying information corresponding to a consumer account;
generating a transaction record for the first purchase request;
generating a label associated with the first purchase request;
determining a store location for a retail store based on consumer information stored in the consumer account;
notifying the computing device that a package of the one or more first items is ready for collection at the store location, wherein the package of the one or more first items is identified using the label;
receiving a scan of the label, which indicates that the package of the one or more first items is collected;
receiving an indication of a second purchase request including one or more second items;
querying an offer database to retrieve a set of offers for which the consumer is eligible based on one or more of the one or more first items and the one or more second items;
storing the set of offers in the consumer account;
based at least in part on the receiving the scan of the label and the receiving the indication of the second purchase request, updating the transaction record with a bifurcated transaction comprising the first purchase request, the second purchase request and an offer selected from the set of offers;
processing payment for the bifurcated transaction including the order of one or more first items together with the second purchase request including the one or more second items and an offer selected from the set of offers;
generating a receipt for the bifurcated transaction including a listing of the one or more first items, the one or more second items and offer information for the selected offer;
querying the offer database to select a new set of offers for the consumer account based on one or more of the one or more first items, the one or more second items and the store location; and
storing the new set of offers in the consumer account.

9. The one or more non-transitory computer-readable storage media of claim 8, wherein the first purchase request includes a plurality of first items;
wherein the label comprises a single machine-readable code;
wherein the operation of receiving the scan of the label comprises receiving the scan of the single machine-readable code, which indicates that the package of the plurality of first items is collected.

10. The one or more non-transitory computer-readable storage media of claim 8, wherein the stored instructions, when executed by the one or more processors, further cause the one or more processors to perform an operation comprising generating the label associated with the first purchase request, wherein the label includes an associated consumer account identifier.

11. The one or more non-transitory computer-readable storage media of claim 8, wherein the stored instructions, when executed by the one or more processors, further cause the one or more processors to perform an operation comprising, in response to receiving the scan of the label, retrieving the transaction records and consumer account information associated with the first purchase request.

12. The one or more non-transitory computer-readable storage media of claim 11, wherein the stored instructions, when executed by the one or more processors, further cause the one or more processors to perform the operation of processing payment for the first purchase request and the second purchase request by processing payment using payment information included in the retrieved consumer account information.

13. The one or more non-transitory computer-readable storage media of claim 11, wherein the stored instructions, when executed by the one or more processors, further cause the one or more processors to perform operations comprising:
generating an electronic receipt of the now completed bifurcated transaction, the electronic receipt including a listing of the one or more first items and the one or more second items and the offer information for the selected offer;
providing the electronic receipt for access by a consumer account identified by the retrieved consumer account information.

14. The one or more non-transitory computer-readable storage media of claim 8, wherein the stored instructions, when executed by the one or more processors, further cause the one or more processors to perform operations comprising:
determining whether the scan of the label corresponds to the transaction record;
in response to determining that the scan of the label corresponds to the transaction record, transmitting a notification to the computing device that the package is collected.

15. A computer-implemented method of managing a bifurcated transaction, the method comprising:
receiving, by a retail store at a store location, a purchase request including an order of one or more first items and account identifying information corresponding to a consumer account;
generating a transaction record for the purchase request;
generating a label associated with the purchase request;
notifying a computing device associated with the consumer account that a package of the one or more first items is ready for collection, wherein the package of the one or more first items is identified using the label;
receiving a scan of a label associated with a package of the one or more first items prepared for in-store collection;
receiving, based on the scan of the label, an existing transaction record for a purchase request including the one or more first items and the consumer account;
receiving a scan of one or more second items selected in-store;
updating the transaction record to include the one or more second items with the one or more first items as a bifurcated transaction;
receiving offer information for an offer selected from a set of offers stored in the consumer account, wherein the offer information is based on the store location and one or more of the one or more first items, the one or more second items, a transaction date, a retailer identity, and an offer redemption history for the consumer account,
processing one payment for the bifurcated transaction including the selected offer;

generating a receipt for the bifurcated transaction including a listing of the one or more first items, the one or more second items and the selected offer;

communicating the receipt and the offer information for the selected offer to an electronic address associated with the consumer account;

querying an offer database to select a new set of offers for the consumer account based on the one or more first items, the one or more second items and the store location; and storing the new set of offers in the consumer account.

16. The method of claim 15, wherein the package includes a plurality of first items;

wherein the label comprises a single machine-readable code;

wherein the receiving the scan of the label comprises receiving the scan of the single machine-readable code, which indicates that the package of the plurality of first items is collected.

17. The method of claim 15, further comprising based at least in part on receiving the scan of the label, receiving consumer account information associated with the purchase request;

wherein the processing payment for the purchase request and the one or more second items further comprising processing payment using payment information included in the consumer account information.

18. The method of claim 15, further comprising:

determining whether the scan of the label corresponds to the transaction record;

in response to determining that the scan of the label corresponds to the transaction record, transmitting a notification to a computing device that the package is collected, wherein the notification includes the offer information for the set of offers based on the one or more first items, the one or more second items and the retail store.

* * * * *